(12) United States Patent
Czaja et al.

(10) Patent No.: US 6,865,173 B1
(45) Date of Patent: Mar. 8, 2005

(54) METHOD AND APPARATUS FOR PERFORMING AN INTERFREQUENCY SEARCH

(75) Inventors: Stanislaw Czaja, Cardiff, CA (US); William Jones, San Diego, CA (US); Thomas Kenney, San Diego, CA (US); Kraig Anderson, San Diego, CA (US)

(73) Assignees: Infineon Technologies North America Corp., San Jose, CA (US); LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/346,784

(22) Filed: Jul. 7, 1999

Related U.S. Application Data
(60) Provisional application No. 60/092,957, filed on Jul. 13, 1998.

(51) Int. Cl.$^7$ .............................................. H04B 7/216
(52) U.S. Cl. ....................... 370/342; 370/503; 455/436; 375/149
(58) Field of Search ............................... 455/436, 439, 455/435; 370/342, 340, 503, 504, 505; 375/147, 149

(56) References Cited

U.S. PATENT DOCUMENTS

| | | | |
|---|---|---|---|
| 5,267,261 A | | 11/1993 | Blakeney, II et al. |
| 5,533,014 A | | 7/1996 | Willars et al. |
| 5,657,316 A | * | 8/1997 | Nakagaki et al. ............ 370/394 |
| 5,682,416 A | | 10/1997 | Schmidt et al. |
| 5,699,478 A | * | 12/1997 | Nahumi ....................... 704/226 |
| 5,978,365 A | * | 11/1999 | Yi ................................ 370/331 |
| 5,999,816 A | * | 12/1999 | Tiedemann, Jr. et al. ... 455/437 |
| 6,160,804 A | * | 12/2000 | Ahmed et al. ............... 370/349 |
| 6,169,731 B1 | * | 1/2001 | Stewart et al. ............... 370/332 |
| 6,169,752 B1 | * | 1/2001 | Banister ....................... 370/506 |
| 6,304,563 B1 | * | 10/2001 | Blessent et al. ............. 370/335 |
| 6,339,590 B2 | * | 1/2002 | Kim ............................. 370/331 |
| 6,351,486 B1 | * | 2/2002 | Edson .......................... 375/150 |

FOREIGN PATENT DOCUMENTS

| | | |
|---|---|---|
| EP | 0 763 902 A1 | 3/1997 |
| WO | WO 97/40593 | 10/1997 |
| WO | WO 98/32262 | 7/1998 |

OTHER PUBLICATIONS

Baier and Panzer, *IEE European Conference on Mobile and Personal Communications*, Dec. 1993, pp. 255–260.

* cited by examiner

*Primary Examiner*—Marsha D. Banks-Harold
*Assistant Examiner*—Nghi H. Ly
(74) *Attorney, Agent, or Firm*—Fish & Richardson P.C.

(57) ABSTRACT

The present invention a system and method are provided for performing an inter-frequency search with reduced loss of link frames in a CDMA system. The CDMA system includes a base station (20) and a mobile station (50). The mobile station (50) has a searcher (164), which searches for pilot channels. The signal strengths of these pilot channels are then reported to the base station (20). This searching results in erased portions of a data frame (238). After the signal strengths are reported to the base station (20), the mobile station (50) informs the base station (20) of the parameters related to the search. These parameters may include the frame of the search, the start position of the search, and the length of the search. The mobile station (50) and the base station (20) then replaces the erased portions of the frame with corrective data such as soft zeros.

27 Claims, 8 Drawing Sheets

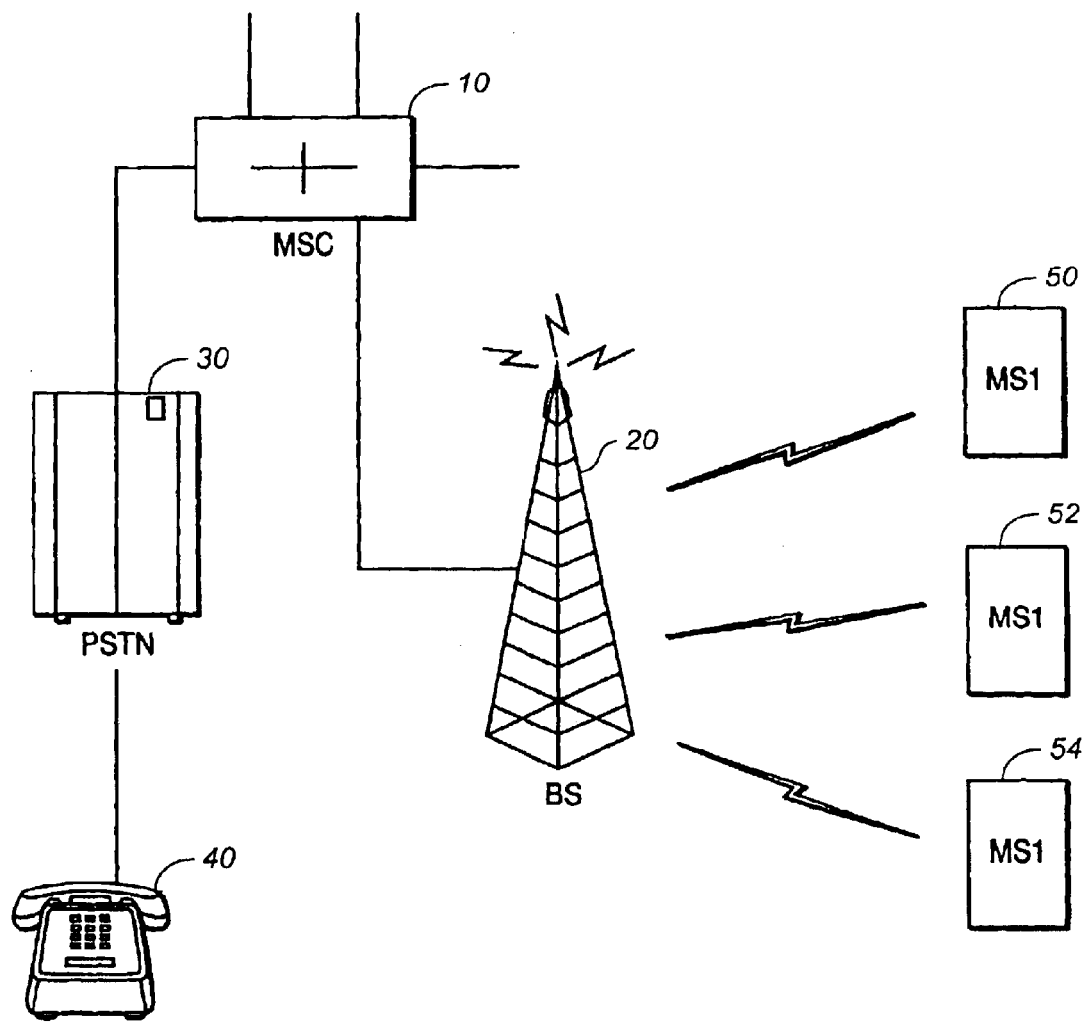
FIG._1
(PRIOR ART)

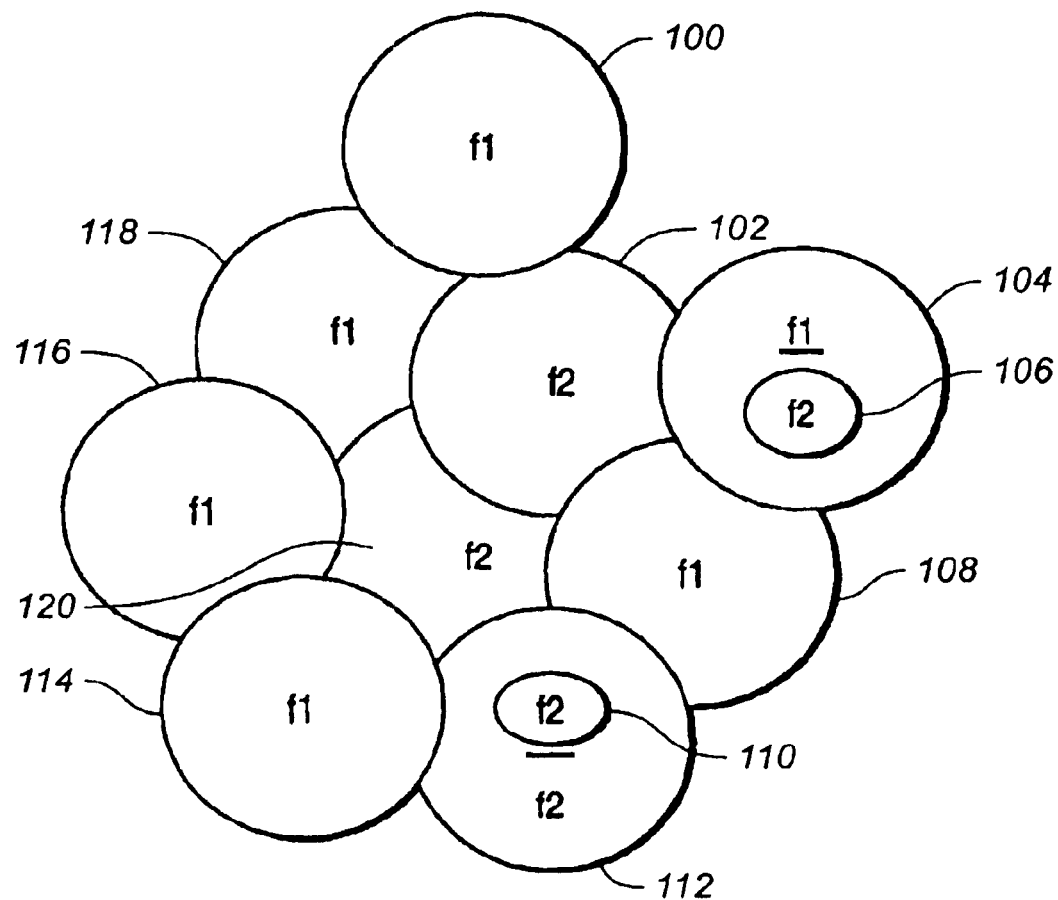
FIG._2
*(PRIOR ART)*

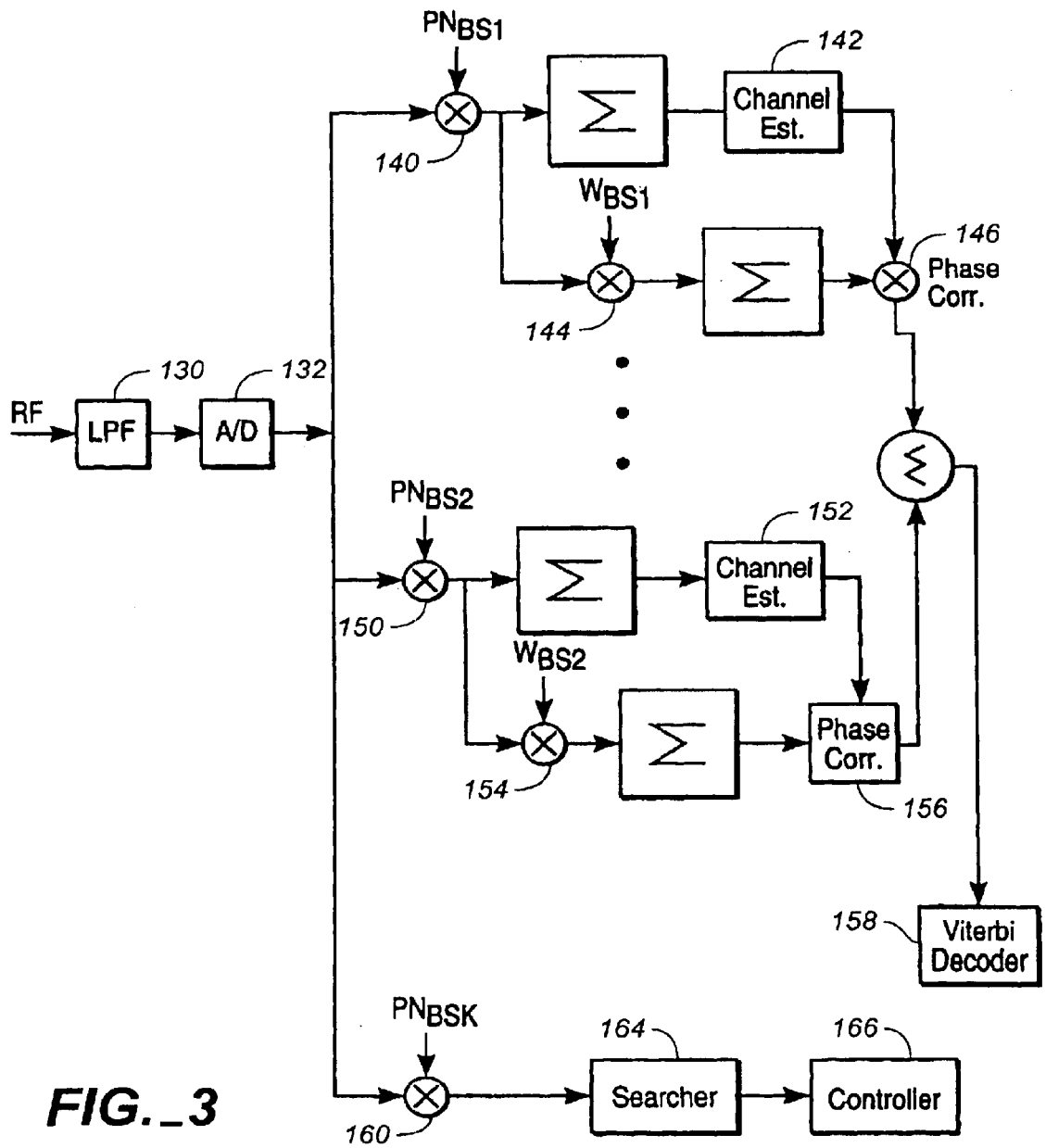
FIG._3

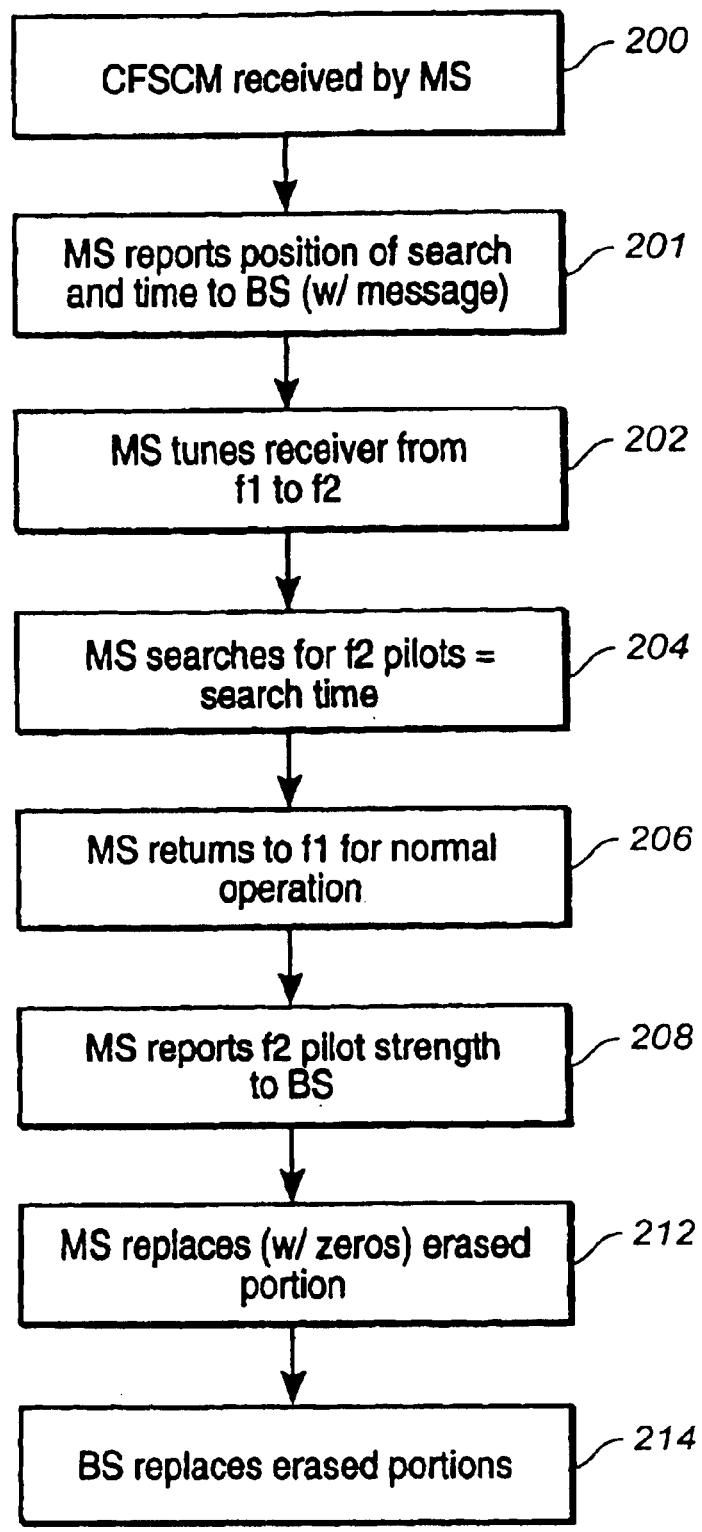
FIG._4

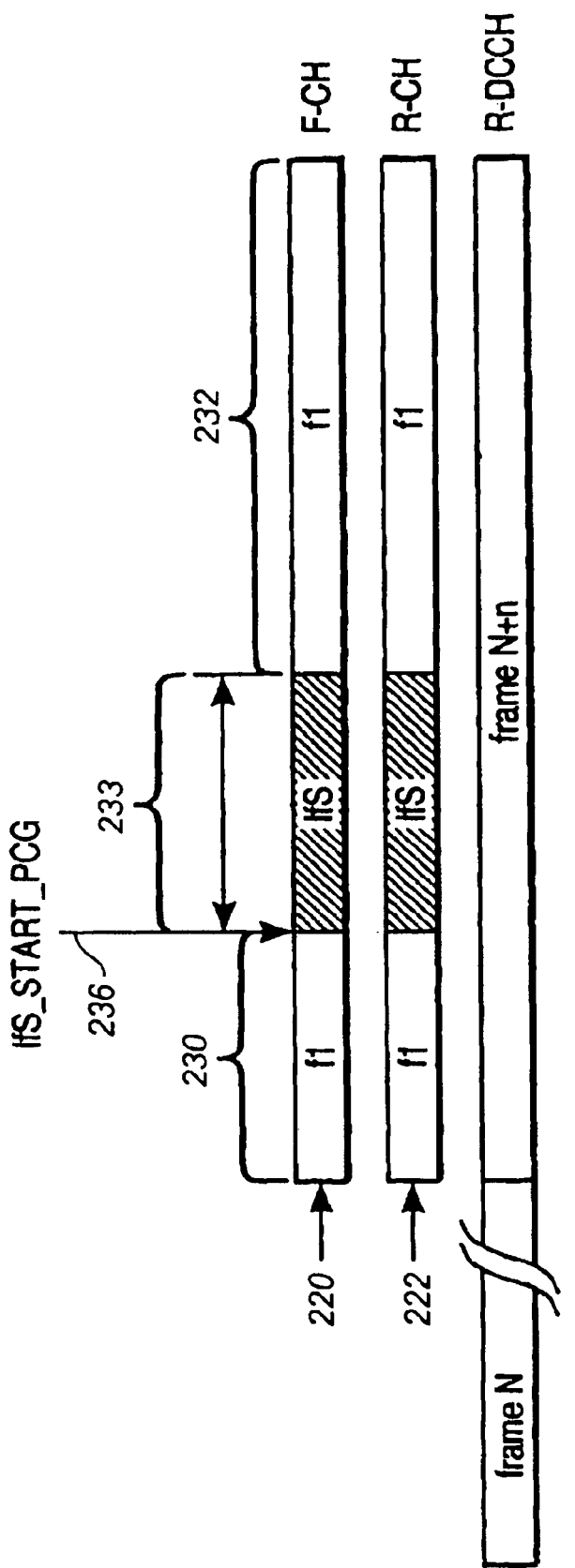
FIG._5

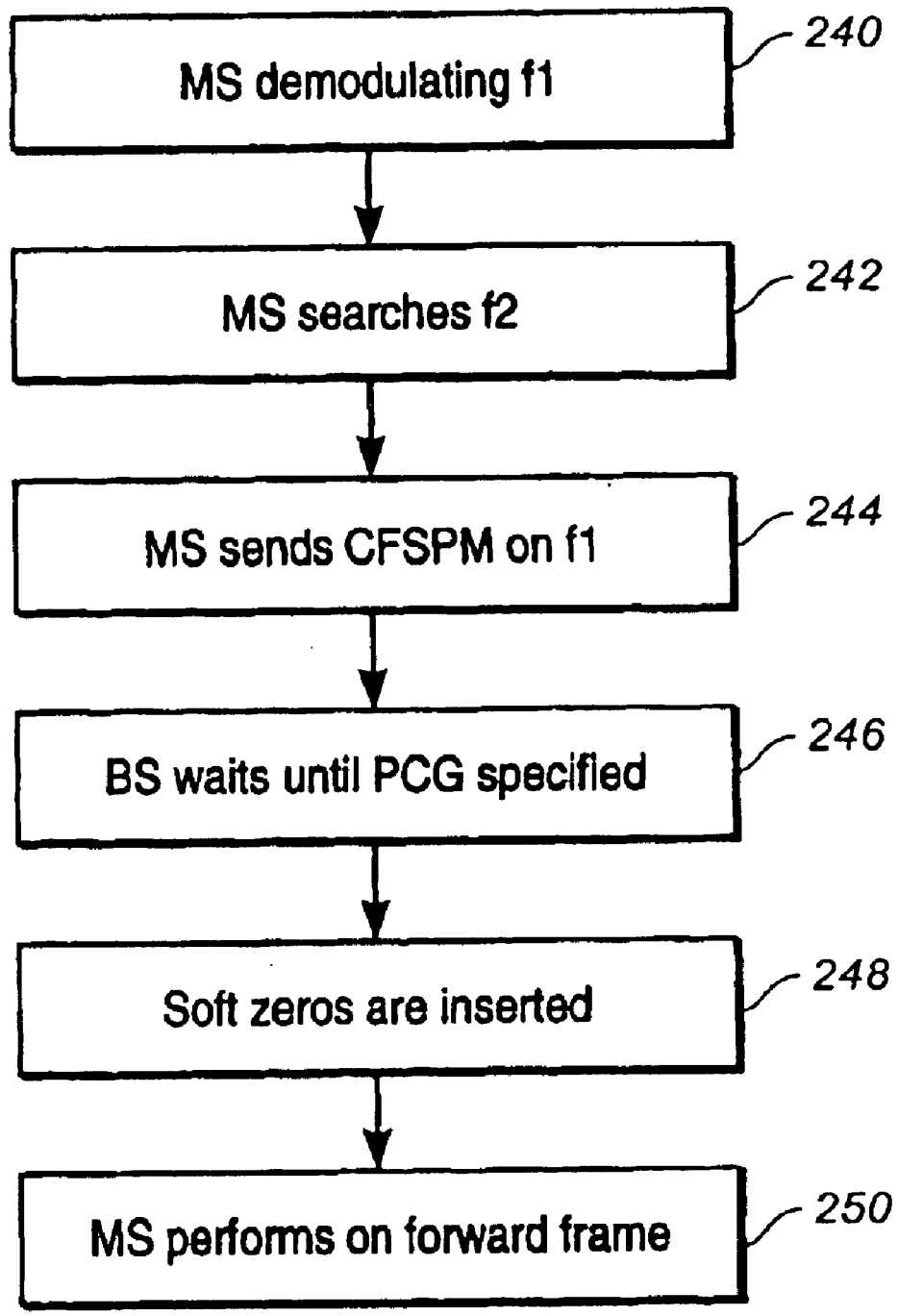
FIG._6

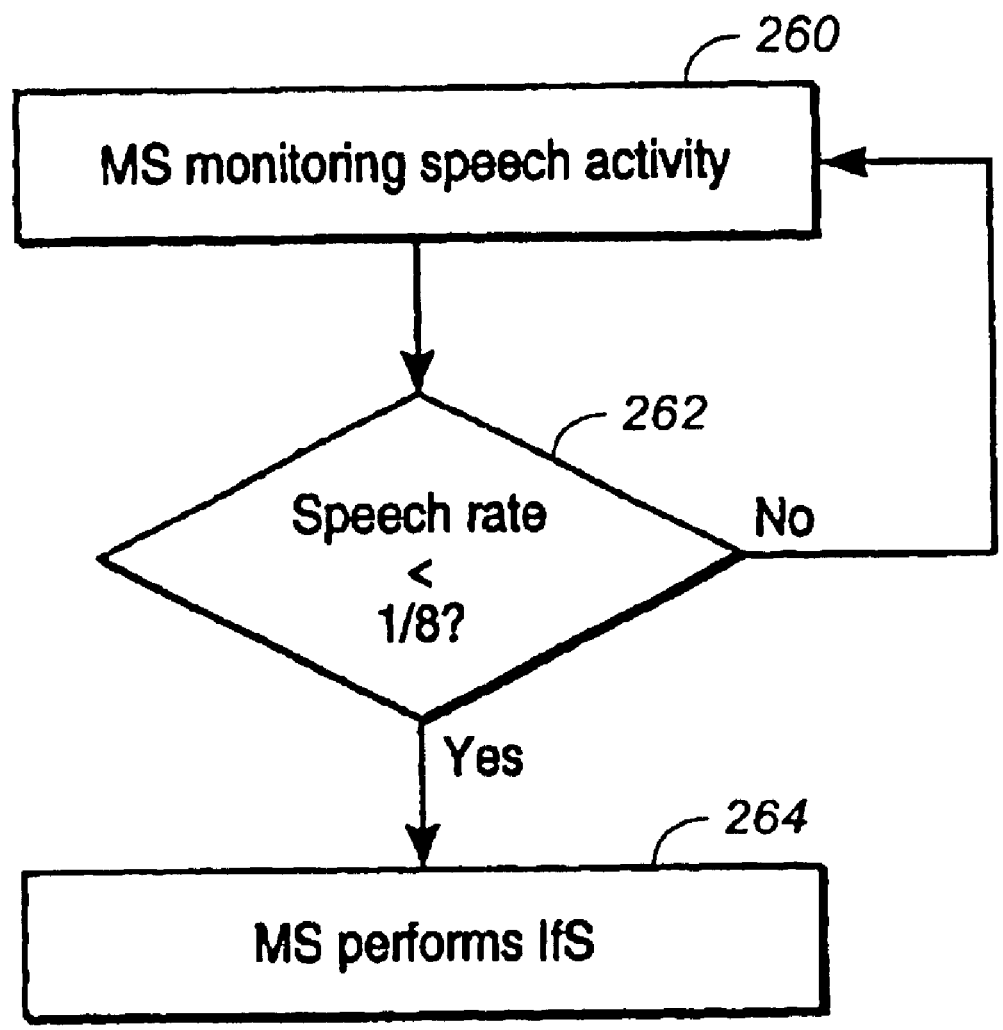
FIG._7

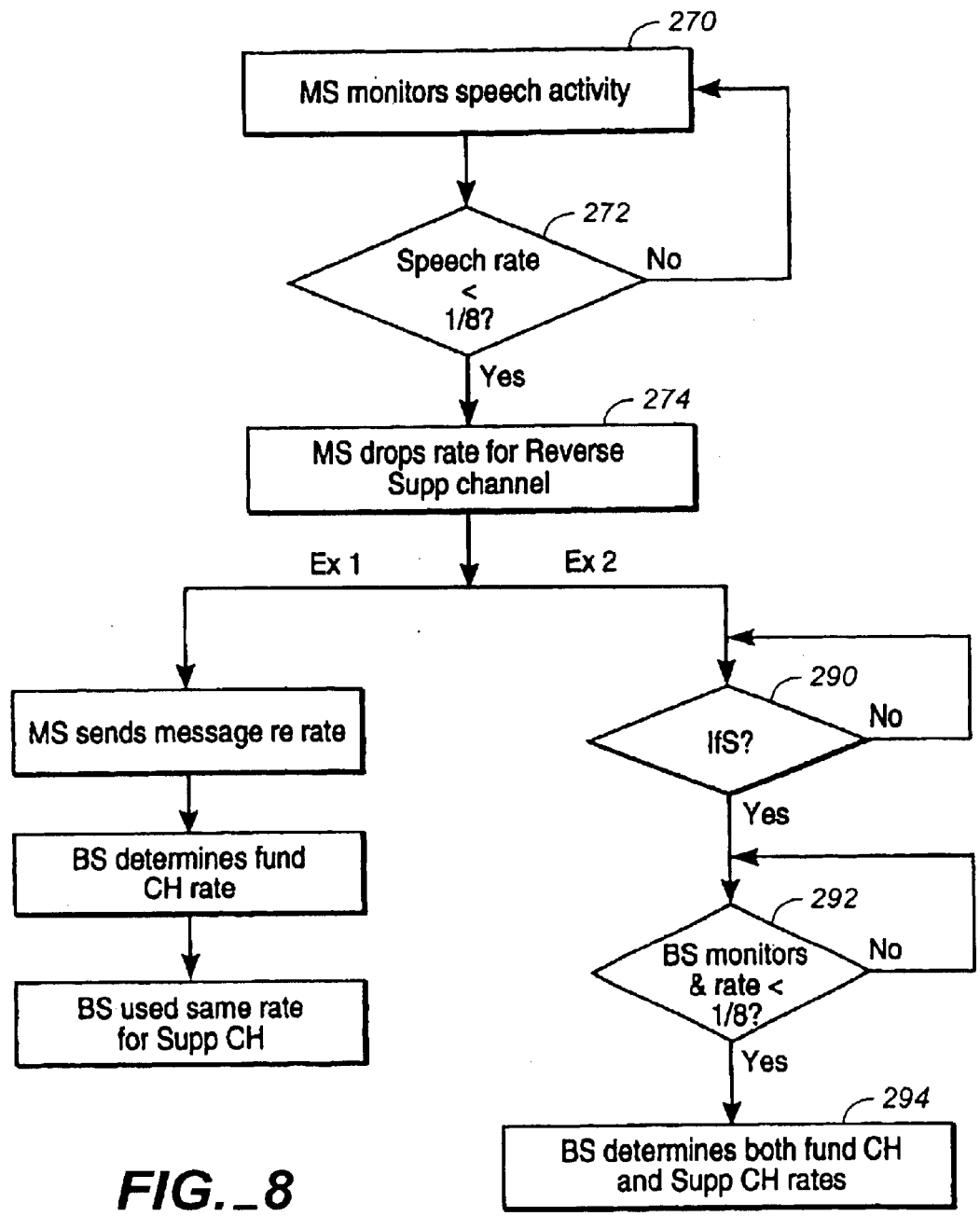
FIG._8

METHOD AND APPARATUS FOR PERFORMING AN INTERFREQUENCY SEARCH

CROSS REFERENCE TO RELATED PATENT APPLICATION

The present application claims priority from Provisional Patent application No. 60/092,957, filed on Jul. 13, 1998, herein incorporated by reference in its entirety.

BACKGROUND OF THE INVENTION

This invention relates generally to spread spectrum communication systems that utilize an inter-frequency search. More particularly, a technique for performing an inter-frequency search with reduced or eliminated loss of link frames is described.

Wireless communication systems have grown dramatically in popularity in recent years. In typical wireless communication systems, mobile stations (e.g., a cellular telephone) communicate with other mobile stations via base stations. To date, a variety of cellular networks have been implemented, and one of the increasingly popular types of networks is referred to as a code division multiple access (CDMA) system.

FIG. 1 provides an overview of a CDMA system. In this system, mobile switching center 10 provides simultaneous communications among multiple base stations 20 while simultaneously routing calls from one or more base station 20 to public switched telephone network (PSTN) 30. PSTN 30 communicates with, for example, telephone 40. The mobile switching center's simultaneous routing makes handoffs between base station 20 and other base stations more reliable. CDMA base stations use one or more CDMA radio channels to provide both control and voice functionality. Base station 20 converts the radio channel to a signal that is transferred to and from mobile switching center 10. Base station 20 can also communicate simultaneously among different sections in a cell, enhancing handoffs. Base station 20 communicates with, for example, mobile stations 50, 52 and 54. Mobile stations 50, 52 and 54 can be, for example, mobile telephones and other types devices that provide wireless communication, such as PCSs, laptop computers or PDAs.

In a CDMA system, there are two types of handoffs, soft and hard. In a soft handoff, the mobile station is allowed to communicate with two or more cell sites enhancing the signal quality. These cell sites must share the same frequency. The CDMA mobile station measures the pilot channel signal strength from adjacent cells and transmits the measurements to the serving base station. The pilot channel provides a reference for coherent channel demodulation and is used as a reference signal level for handoff decisions. The mobile station must be synchronized to the pilot channel pseudo noise (PN) phase before accessing any other control channel. When an adjacent base station's pilot channel signal is strong enough, the mobile station moves the base station pilot into a candidate set and sends a pilot strength measurement message indicating the pilot signal energy. Now, both base stations (i.e., the current and the new one) send an extended handoff direction message, which requests the addition of the new base station pilot to the mobile stations active set of pilots. The new base station also starts transmitting a signal to the mobile station, while the mobile station tunes to the arriving signal from the new base station. This tuning occurs when the mobile station assigns a demodulating element (e.g., a finger on a rake receiver) to the arriving signal. Thus, during the soft handoff, the mobile station is communicating with both base stations simultaneously. During soft handoff, the mobile station utilizes time diversity to use signals from both base stations. The mobile station adds the new signal in a maximum ratio combiner before the decoding.

In contrast, during a hard handoff, the mobile station terminates the communication link with the current servicing base station before establishing the link with the new base station. This technique is similar to the technique used in time division multiple access (TDMA) and global system for mobile communication (GSM) systems. Hard handoffs occur when the mobile station's receiver is switching between a base station of one frequency and a base station of a different frequency. Usually, there is only one receiver in a mobile station, and that receiver can only receive data from one frequency at any given time. Therefore, a soft handoff is not possible when switching between base stations with different frequencies. FIG. 2 illustrates base stations with different frequencies. For example, cells 100, 104, 108, 114, 116 and 118 use a first frequency and cells 102, 106, 110, 112 and 120 use a second frequency. Microcells 106 and 110 are used, for example, in shopping malls, office buildings and other indoor facilities.

Currently available hard handoff techniques can result in a dropped or lost telephone call. If the searcher in the cellular telephone mobile station uses, for example, a sequential sliding correlator (SSC) algorithm, and the search window size is 192 clips, then the total search time for a typical system with a 1× spreading note is as follows:

$$SF = 192 \times C_L \times 0.8^{-6} [S]$$

$$= 192 \times 768 \times 0.8^{-6} = 0.18 \text{ seconds}$$

where: $C_L$ is the average correlation length to achieve 0.99 depiction probability or approximately 20 frames. Because the frequency search message contains more than one base station offset in this example, the loss of service quality can be significant if the mobile station performs all searches in one period. If 20 frames are lost, then the telephone call will likely be so dropped.

The IS-95 standard combines new digital CDMA and advanced mobile phone service (AMPS) functionality. IS-95A CDMA systems do not allow for inter-frequency searches because of the continuous nature of the CDMA waveforms. The inter-frequency search, also called mobile assisted hard handoff, was introduced in the IS-95B CDMA standard. The mobile assisted hard handoff can be performed without any timing restrictions (i.e., there is no restriction on the length of time used for this handoff). As a result, the mobile station is allowed to erase as many data frames (or portions of data frames) of the forward or reverse links as needed to perform the inter-frequency search.

The forward link is the data link from the base station to the mobile station, and the reverse link is the data link from the mobile station to the base station.

Currently, the CDMA mobile station performing the inter-frequency search will erase one or more of forward link frames and reverse link frames.

The IS-95B standard includes a gated-off transmission technique on the reverse link. A gated-off transmission is used when voice activity is low, and this allows voice data to be sent at different rates depending on the voice activity. For example, when voice activity drops to a low rate (e.g., ⅛ of the full rate), the transmission can be gated-off such that ⅛ of the normal amount of date is transmitted. This gated-off transmission on the reverse link allows the mobile station to perform the inter-frequency search during the period when the transmitter is gated-off. This technique minimizes the impact on the reverse link.

A mobile station in a third generation CDMA system, such as cdma2000, does not gate-off its transmitter during the transmission of lower rates. Thus, the erasure (i.e., loss) of both forward and reverse link frames is particularly true in this situation. Most of the third generation CDMA systems allow for a mixture of different classes of service, such as speech over data. In the cdma2000 system, this is achieved by allowing a simultaneous transmission on many physical channels. For example, fundamental channels and supplemental channels each carry a different payload. Additionally, since speech is carried on a fundamental channel and uses variable (i.e., speech activity driven) data rates, while a supplemental channel usually uses higher fixed (i.e., assigned) data rates, it is eminent that one or both of these channels will experience erasure during the inter-frequency search. Therefore, the likelihood of erasing links increases with, for example, the cdma2000 standard because the cdma2000 standard allows the mixing of different classes of services (e.g., data and voice services) on the fundamental and supplemental channels. It is desirable to have an inter-frequency search with minimal loss link frames in a CDMA system.

SUMMARY OF THE INVENTION

The present invention provides a technique for performing an inter-frequency search with reduced or eliminated loss of link frames in a CDMA system. In the preferred embodiment, the CDMA system includes a base station and a mobile station. The mobile station has a searcher, which measures the signal strength of the base station pilot channels. The signal strengths of these pilot channels are then reported to the base station. Usually, there is only one RF receiver in the mobile station. Thus, the mobile station cannot receive data on one frequency while searching for pilot channels on another frequency. As a result, this searching during a hard handoff produces erased portions of at least one data frame.

Before the search on the candidate frequency is performed, the mobile station informs the base station of the parameters related to the search. In the preferred embodiment, these parameters include the frame of the search, the start position of the search, and the length of the search. This allows the mobile station and/or the base station to replace the erased portions of the frame(s) with corrective data such as soft zeros.

BRIEF DESCRIPTION OF THE FIGURES

FIG. 1 provides an overview of a CDMA system;

FIG. 2 illustrates cells of base stations with different frequencies;

FIG. 3 illustrates a device configuration for implementing the present invention;

FIG. 4 provides a process flowchart for the inter-frequency search of the present invention;

FIG. 5 provides a diagram illustrating one procedure used by the present invention;

FIG. 6 provides a process flowchart for one embodiment of the present invention;

FIG. 7 provides a process flowchart for an autonomous inter-frequency search; and FIG. 8 provides a process flowchart for an inter-frequency search with full rate determination.

DETAILED DESCRIPTION

The present invention provides several embodiments for providing an inter-frequency search procedure that significantly reduces additional power requirements while achieving comparable or better performance. FIG. 3 illustrates a device configuration for implementing the present invention. A band limited signal is filtered by low pass filter 130 and then received by analog to digital converter 132 (A/D converter). A pseudo random sequence from base station 1 is received by multiplier 140 along with the signal exiting A/D converter 132. The signal from multiplier 140 is sent to channel estimator 142 and multiplier 144. Multiplier 144 also receives a Walsh code from base station 1. The signals from channel estimator 142 and multiplier 144 are then sent to phase corrector 146. In this example, phase corrector 146 is also a multiplier. A similar operation is performed for base station 2 with multiplier 150, channel estimator 152, multiplier 154 and phase corrector 156. In this example, phase corrector 156 is not a multiplier. The sum of the signals from phase correctors 146 and 156 are then sent as soft data to viterbi decoder 158 in the preferred embodiment. In FIG. 3, the thin signal lines represent real data, and the thick signal lines represent complex data.

The signal from AND converter 132 is also sent to multiplier 160. Multiplier 160 also receives a pseudo random sequence from another base station. The signal from multiplier 160 is sent to searcher 164 and then to controller 166. Searcher 164 and controller 166 perform the inter-frequency search.

FIG. 4 provides a process flowchart for the inter-frequency search of the present invention. At step 200, the mobile station receives a candidate frequency search control message (CFSCM). At step 201, the mobile station informs the base station of the position and the length of the search on frequency f2. At step 202, the mobile station tunes its receiver from frequency f1 to frequency f2. At step 204, the mobile station performs the search of f2 Pilots. In this embodiment, the mobile station's receiver can only receive data on one frequency at one given time. Therefore, during the search time, no data is received from frequency f1. At step 206, the mobile station returns to frequency f1 and continues normal operation. At step 208, the mobile station reports the frequency f2 Pilots' strength to the base station. During the time the mobile station is searching the frequency f2 (i.e., search time), the frequency f1 forward and reverse links are disrupted. This results in a negative impact on the quality of service of data transferred on frequency f1. The present invention allows the mobile station to perform the inter-frequency search while minimizing frame erasure on the forward and reverse links. This reduces or eliminates the negative impact on the quality of service.

At step 212 in FIG. 4, the mobile station replaces the erased portion of the frame with, for example, soft zeros. Thus these soft zeros are used to replace any data received in error from frequency f2 and to minimize the negative impact on the quality of service. Alternatives to soft zeros can also be utilized in the present invention.

If the inter-frequency search period is short relative to the length of the frame, then the probability of losing the forward channel frame is low because the transmitted symbols are interleaved over the entire frame period. When the inter-frequency search period is short, the inter-frequency search disruption of the forward channel can be seen as a fade (i.e., loss of signal for a short period of time or lowering of the power) of the received signal. If the inter-frequency search position and length are known to the base station, it can also perform the same operation (i.e., replacing the erased portion of the frame with soft zeros), thus minimizing the impact on the reverse link. This is shown in step 214 of FIG. 4.

In the preferred embodiment, a dedicated message is used to provide the inter-frequency search communication and synchronization between the base station and the mobile station. This message is referred to as a candidate frequency search position message (CFSPM) and may be placed, for example, on the reverse dedicated control channel (R-DCCH) or on the reverse common control channel (R-CCCH) to indicate the position and the length of the inter-frequency search. The R-DCCH is dedicated to one mobile station, and the R-CCCH is for all mobile stations.

In another embodiment of the present invention, the synchronization is provided by the base station. In this embodiment, the base station pushes search parameters to the mobile station, such that the inter-frequency search is performed at the action time specified in a message from the base station. In either embodiment, the search position can be defined in, for example, units of power control group (PCG) or in milliseconds. In the IS-95B and cdma2000 standards, the length of the PCG is 1.25 ms (800 Hz).

FIG. 5 provides a diagram illustrating one procedure used by the present invention. In this diagram, 220 identifies the forward channel and 222 identifies the reverse channel. Frame N+n contains data received by the rake receiver, which is located in the mobile station. Data sections 230 and 232 were received while the receiver was tuned to frequency f1. The receiver was tuned from frequency f1 to frequency f2 at start time position 236. Date section 238 was received while the receiver was tuned to frequency f2. Thus, time 236 provides the start time or position of the inter-frequency search, and section 238 provides the duration or length of the inter-frequency search.

In the preferred embodiment, the following three parameters are used to characterize the inter-frequency search (IFS): (1) the frame in which the search is performed, (2) the start of the search within the frame, and (3) the length of the search. In the preferred embodiment, the message contains the following fields:

IFS_FRAME_OFFSET 6 bits (describes the frame position from CFSPM message)

IFS_START_PCG 4 bits (defines the PCG in which IFS starts)

IFS_LENGTH_PCG 4 bits (defines the # of PCG used for IFS search)

FIG. 6 provides a process flowchart for one embodiment of the present invention. At step 240, the mobile station (MS) is demodulating frequency $f_1$ (see also section 230 in FIG. 5). At step 242, the mobile station is directed by the base station (BS) to perform a search of frequency $f_2$. At step 244, the mobile station sends the candidate frequency search position message (CFSPM) on frequency $f_1$ with the above-described parameters (e.g., searched frame, search start position and search length). At step 246, in the frame specified by the parameter IFS_FRAME_OFFSET, the base station waits until PCG is specified in parameter IFS_START_PCG. Then, at step 248, to overcome the loss of the reverse link symbols, the base station replaces the indicated portion of the frame with soft zeros. For example, zeros are inserted by the following:

For IFS$_{13}$ LENGTH_PCG

Rx_SYMBOLS<='soft_zeros'

At step 250, the mobile station performs the same operation for the forward traffic channel frame.

In another embodiment, the mobile station performs the inter-frequency search autonomously without network knowledge. FIG. 7 provides a process flowchart for an autonomous inter-frequency search. At step 260, the mobile station monitors speech activity when it is present on the reverse channel. At step 262, the mobile station checks for a natural drop in speech activity. When the speech rate drops to a low rate (e.g., ⅛ of the normal rate), the process moves to step 264, and the mobile station performs the inter-frequency search for a fraction of the frame period (e.g., for several power control groups).

During the inter-frequency search, the mobile station receiver is tuned to frequency f2. Therefore, the mobile station does not receive any signal on the serving frequency $f_1$. This will normally cause an erasure of a portion of the forward link frame. However, since the mobile station knows the timing of the inter-frequency search, it can replace the missing channel symbols with the soft zeros. If the inter-frequency search period is relatively short in comparison to the length of the frame, then the probability of losing the forward channel frame is low because the transmitted symbols are interleaved over the entire frame period. In this embodiment, the inter-frequency search disruption of the forward channel can be seen, for example, as a flat (i.e., shadow) fade of the received signal.

In yet another embodiment of the present invention, data rates on multiple channels are determined. FIG. 8 provides a process flowchart for an inter-frequency search with full rate determination. At step 270, the mobile station again monitors speech activities. When the speech rate drops below a predetermined threshold at step 272, the process moves to step 274. At step 274, the mobile station drops the data rate for the reverse supplemental channel such that its data rate matches the data rate of the reverse fundamental channel. As set forth above, the supplemental channel usually carries data with a higher, fixed rate, and the fundamental channel usually uses a variable data rate that is speech activity driven. If the data rates on both channels are the same, then the position and length of the inter-frequency search will be the same on both channels. This simplifies the correction procedure when both channels are in use (e.g., in voice over IP applications).

In normal operation, the base station only checks the reverse fundamental channel for data rate variation because the data rate on the supplemental channel is normally fixed. Therefore, an alteration must be made so that the base station is aware of the rate change on the supplemental channel. In one embodiment, the base station is notified of the change in data rate on the supplemental channel. In this embodiment, the candidate frequency search response message can be used to notify the base station of the change in data rate at step 276. This notification can be placed, for example, in a new field that is added into the candidate frequency search response message or in the reserved bits of this message. At step 278, the base station performs a rate determination on the reverse fundamental channel. At step 280, the base station uses the rate from this rate determination for both the reverse fundamental channel and the reverse supplemental channel.

In a another embodiment, the base station performs a rate determination on the reverse supplemental channel without any notification from the mobile station. At step 290, the process moves forward only if the base station directs the mobile station to perform an inter-frequency search. At step 292, the process moves forward only if the base station receives a low data rate frame on the reverse fundamental channel (e.g., ⅛ of the full data rate). At step 294, the base station performs rate determinations on both the fundamental channel and the supplemental channel. Therefore, the base station detects the rate change on the supplemental channel.

The present invention can be used with any CDMA system that includes a continuous channel or any other wideband CDMA system such as UMTS.

What is claimed is:

1. A method for inter-frequency search by a mobile station in a wireless communication system, the method comprising:
   in the mobile station receiving a forward link signal carrying forward communication data from a first base station on a first frequency;
   at the mobile station, setting at least one timing parameter that sets a start time and a duration of an inter-frequency search that will be performed by the mobile station;
   transmitting the at least one timing parameter of the inter-frequency search to the first base station using a reverse link signal carrying reverse communication data from the mobile station;
   tuning the mobile station to a candidate frequency other than the first frequency during the inter-frequency search having the start the and the duration set by the at least one timing parameter, the inter-frequency search causing the mobile station to lose data both in the forward link signal from the first base station ard in the reverse link signal to the first base station;
   using the at least one turning parameter to determine from which portions of forward and reverse communication data is data lost due to the inter-frequency search;
   in the, first base station replacing the determined portion of reverse communication data with predefined data, so that data that is lost from the reverse link signal is replaced with the predefined data; and
   in the mobile station, replacing the determined portion of forward communication data with predefined data, so that data that is lost from the forward link signal is replaced with the predefined data.

2. The method of claim 1, wherein transmitting the at least one timing parameter to the first base station comprises:
   transmitting the at least one timing parameter to the first base station in a candidate frequency search position message.

3. The method of claim 2, wherein transmitting the at least one timing parameter to the first base station in a candidate frequency search position message comprises:
   transmitting the at least one timing parameter to the first base station in a candidate frequency search position message that is placed in at least one of a reverse dedicated control channel and a reverse common control channel.

4. The method of claim 1, further comprising:
   in the mobile station, receiving a request for the inter-frequency search from the first base station.

5. The method of claim 1, further comprising:
   in the mobile station, measuring a signal strength of a second base station while the mobile station is tuned to the candidate frequency.

6. The method of claim 5, further comprising:
   reporting the measured signal strength to the first base station.

7. The method of claim 1, wherein replacing the determined portion of forward communication data with predefined data comprises:
   replacing the determined portion of forward communication data with soft zeros.

8. The method of claim 1, wherein setting at least one timing parameter comprises:
   setting a frame, a start position within the frame to set the start time of the inter-frequency search, and a length within the frame to set the duration of the inter-frequency search.

9. The method of claim 8, wherein setting the start position of the inter-frequency search comprises:
   defining the start position of the inter-frequency search in power control group units.

10. The method of claim 9, wherein defining the start position comprises:
    defining the start position of the inter-frequency search in power control group units, wherein one power control group unit is 1.25 ms.

11. The method of claim 1, wherein setting the at least one timing parameter comprises:
    setting the at least one timing parameter such that the mobile station will perform the inter-frequency search when speech activity rate drops to a low rate.

12. The method of claim 11, further comprising:
    in the mobile station, monitoring the speech activity rate.

13. The method of claim 11, further comprising:
    in the mobile station, lowering data rate on a reverse supplemental channel to match speech activity rate on a reverse fundamental channel.

14. The method of claim 13, further comprising:
    sending a rate message to the first base station, the rate message notifying the first base station of future lowering of data rate on the reverse supplemental channel.

15. The method of claim 14, further comprising:
    in the first base station, determining a data rate on the reverse fundamental channel, and using the determined data rate to identify data rate on the reverse supplemental channel.

16. A method for inter-frequency search by a mobile station communicating with a first base station in a wireless communication system, the method comprising:
    at the first base station, receiving a reverse link signal carrying reverse communication data from the mobile station on a first frequency;
    at the mobil station setting at least one timing parameter that sets a start time and a duration of an inter-frequency search that includes tuning the mobile station to a candidate frequency other than the first frequency, the inter-frequency search causing a data loss in the reverse link signal;
    transmitting the at least one timing parameter of the inter-frequency search to the first base station using the reverse link signal;
    using the at least one timing parameter to determine from which portion of reverse communication data is data lost due to the inter-frequency search; and
    in the first base station, replacing the determined portion of reverse communication data with predefined data, so that data that is lost from the reverse link signal is replaced with the predefined data.

17. The method of claim 16, further comprising:
    in the mobile station, receiving a forward link signal carrying forward communication data from the first base station, the inter-frequency search causing the mobile station to lose data in the forward link signal from the first base station;

in the mobile station, replacing a portion of forward communication data with predefined data so that data that is lost from the forward link signal is replaced with the predefined data, the replaced portion of forward communication being determined using the at least one timing parameter of the inter-frequency search.

18. The method of claim 16, further comprising:

transmitting a request for the inter-frequency search to the mobile station.

19. The method of claim 18, further comprising:

in the first base station, determining data rate on a reverse supplemental channel after transmitting the request for the inter-frequency search from the mobile station.

20. The method of claim 16, further comprising:

at the first base station, receiving a measured signal strength of a second base station, the measured signal strength being transmitted by the mobile station.

21. The method of claim 16, wherein replacing the determined portion of reverse communication data with predefined data comprises:

replacing the determined portion of reverse communication data with soft zeros.

22. The method of claim 16, wherein setting at least one timing parameter comprises:

setting a frame and a start position within the frame to set the start time of the inter-frequency search, and a length within the frame to set the duration of the inter-frequency search.

23. A wireless communication system comprising: a mobile station configured to communicate in the wireless communication system using a forward link signal and a reverse link signal on a first frequency;

to set the at least one timing parameter;

to transmit the at least one timing parameter to the first base station, and to perform an inter-frequency search having a start time and a duration that are set by at least one timing parameter, wherein the inter-frequency search includes tuning the mobile station to a candidate frequency other than the first frequency, the inter-frequency search causing the mobile station to lose communication data in the forward and reverse link signals; and a first base station configured to receive the reverse link signal from the mobile station on the first frequency;

to receive the at least one timing parameter from the mobile station; and to replace a portion of reverse communication data that is determined using the at least one timing parameter of the interfrequency search with predefined data, so that data that is lost from the reverse link signal is replaced with predefined data.

24. The wireless communication system of claim 23, wherein the mobile station is configured to replace a portion of forward communication data with predefined data so that data that is lost from the forward link signal is replaced by the predefined data, wherein the portion of forward communication data is determined using the at least one timing parameter.

25. The wireless communication system of claim 23, wherein the first base station is configured to replace the portion of reverse communication data with soft zeros.

26. The wireless communication system of claim 23 wherein the mobile station is configured to perform an inter-frequency search having a pre-set start time and a pre-set duration, the pre-set start time being defined by a fame of the inter-frequency search and a start position within the frame, and the preset duration being defined by a length within the frame.

27. A method for inter-frequency search by a mobile station in a wireless communication system, the method comprising:

in the mobile station, receiving a forward link signal carrying forward communication data from a first base station on a first frequency;

in the mobile station, setting at least one timing parameter that sets a start time and a duration of an inter-frequency search that will be performed by the mobile station;

transmitting the at least one timing parameter to the first base station using a reverse link signal carrying reverse communication data from the mobile station;

timing the mobile station to a candidate frequency other than the first frequency during the inter-frequency search having the start time and the duration set by the at least one timing parameter, the inter-frequency search causing data loss in the forward and reverse link signals;

in the mobile station, replacing a portion of forward communication data with predefined data, the replaced portion of forward communication data being determined using the at least one timing parameter of the inter-frequency search so that data that is lost from the forward link signal is replaced with the predefined data; and in the first base station, replacing a portion of reverse communication data with predefined data, the replaced portion of reverse communication data being determined using the at least one timing parameter of the inter-frequency search so that data that is lost from the reverse link signal is replaced with the predefined data.

* * * * *